US012691953B2

(12) United States Patent
　Thompson

(10) Patent No.: US 12,691,953 B2
(45) Date of Patent: Jul. 28, 2026

(54) TAIL GATE EXTENSION

(71) Applicant: Marcus Thompson, Decatur, AL (US)

(72) Inventor: Marcus Thompson, Decatur, AL (US)

( * ) Notice: Subject to any disclaimer, the term of this patent is extended or adjusted under 35 U.S.C. 154(b) by 388 days.

(21) Appl. No.: 18/227,366

(22) Filed: Jul. 28, 2023

(65) Prior Publication Data

US 2024/0034418 A1　Feb. 1, 2024

Related U.S. Application Data

(60) Provisional application No. 63/392,912, filed on Jul. 28, 2022.

(51) Int. Cl.
　*B62D 33/027*　(2006.01)
　*B60P 3/40*　(2006.01)
　*B62D 33/03*　(2006.01)
(52) U.S. Cl.
　CPC ............ *B62D 33/0273* (2013.01); *B60P 3/40*
　　(2013.01); *B62D 33/03* (2013.01)
(58) Field of Classification Search
　CPC ........ B62D 33/0273; B62D 33/03; B60P 3/40
　USPC ................................... 296/37.6, 50, 51, 57.1
　See application file for complete search history.

(56) References Cited

U.S. PATENT DOCUMENTS

| | | | | |
|---|---|---|---|---|
| 1,342,654 | A * | 6/1920 | Torgerson .......... | B62D 33/0215 |
| | | | | 410/37 |
| 1,639,879 | A * | 8/1927 | Buffington ................ | B60P 1/43 |
| | | | | 296/61 |
| 6,149,219 | A * | 11/2000 | Schambre .......... | B62D 33/0273 |
| | | | | 296/26.11 |
| 7,044,699 | B1 * | 5/2006 | St. Denis .................. | B60P 3/40 |
| | | | | 410/42 |
| 9,902,307 | B2 * | 2/2018 | Higgins ................. | B62D 33/03 |
| 10,525,870 | B2 * | 1/2020 | Neighbors ................ | B60P 7/15 |
| 10,589,796 | B1 * | 3/2020 | Salvia, III .............. | B62D 33/08 |
| 11,873,033 | B2 * | 1/2024 | Lehti ........................ | B60R 3/02 |

FOREIGN PATENT DOCUMENTS

WO　WO-2004082994 A1 *　9/2004　................ B60P 3/40

* cited by examiner

*Primary Examiner* — Jonathan Malikasim
(74) *Attorney, Agent, or Firm* — Dennen IP Law, LLC

(57)　ABSTRACT

A truck of the present disclosure has a tailgate has a compartment, at least one left tail gate extension arm rotatably foldable to an outward position from an opening in the compartment, and at least one right tail gate extension arm rotatably foldable to an outward position from an opening in a compartment configured for carrying loads.

23 Claims, 3 Drawing Sheets

TAIL GATE EXTENSION

CROSS-REFERENCE TO RELATED APPLICATION

This Nonprovisional Patent Application entitled Tailgate Extension Devices and Methods claims priority to Provisional Patent Application Ser. No. 63/392,912 entitled Tailgate Sawhorse Devices and Methods and filed Jul. 28, 2022, which is incorporated herein by reference.

BACKGROUND

A truck's tailgate panel is the entrance to the truck bed or cargo compartment. The truck's tailgate panel can serve many different purposes, from a pregame party area during football season to an outdoor workstation. The tailgate panel also serves as a step stool, an aid to help load and unload cargo, and a measuring tool.

The tailgate is a panel at the back end of the truck that can be rotatably moved downward to a horizontal position contiguous with the bed of the truck. As mentioned, the tailgate can be used for loading and unloading cargo.

The rearward extremity of the cargo compartment of a pickup truck of conventional design is coupled to the tailgate. The cargo compartment is defined by opposed side panels, a forward panel, floor, and the tailgate panel.

The tailgate apparatus is comprised of a tailgate panel 14, which is substantially rectangular configuration having upper and lower horizontal edges and opposed side edges. The outer surface of the tailgate panel extends beyond the side edges, forming elongated overhang strips.

Each side edge of the tailgate panel makes up a brace. Each brace is made of upper and lower elongated flat rms. The upper or proximal extremity of each upper arm is attached by pivot bolt to a corresponding sidewall of the cargo compartment. The lower or proximal extremity of lower arm is attached by pivot bolt ma corresponding side edge of the tailgate panel. The upper arm is provided with coextensive oriented elongated slot. A second bearing post is fixedly attached to the distal extremity of lower arm, and slidably engages a slot.

The distal or traveling extremities of the arms are accordingly inter-engaged in a manner permitting scissor-like folding in a vertical plane. In other embodiments, the locations of the elongated slot and second bearing post may be reversed amongst the arms.

When the tailgate panel is in its lower rearwardly protruding position, the arms are aligned along a straight line diagonally disposed between the cargo compartment and tailgate panel. When the tailgate panel is in its upper stored position the arms are vertically oriented and folded.

BRIEF DESCRIPTION OF THE DRAWINGS

The present disclosure can be better understood referencing the following drawings. The elements of the drawings are not necessarily to scale relative to each other, emphasis instead placed upon clearly illustrating the principles of the present disclosure. Furthemlore, like reference numerals designate corresponding parts throughout the several views.

DETAILED DESCRIPTION

Figure 1:
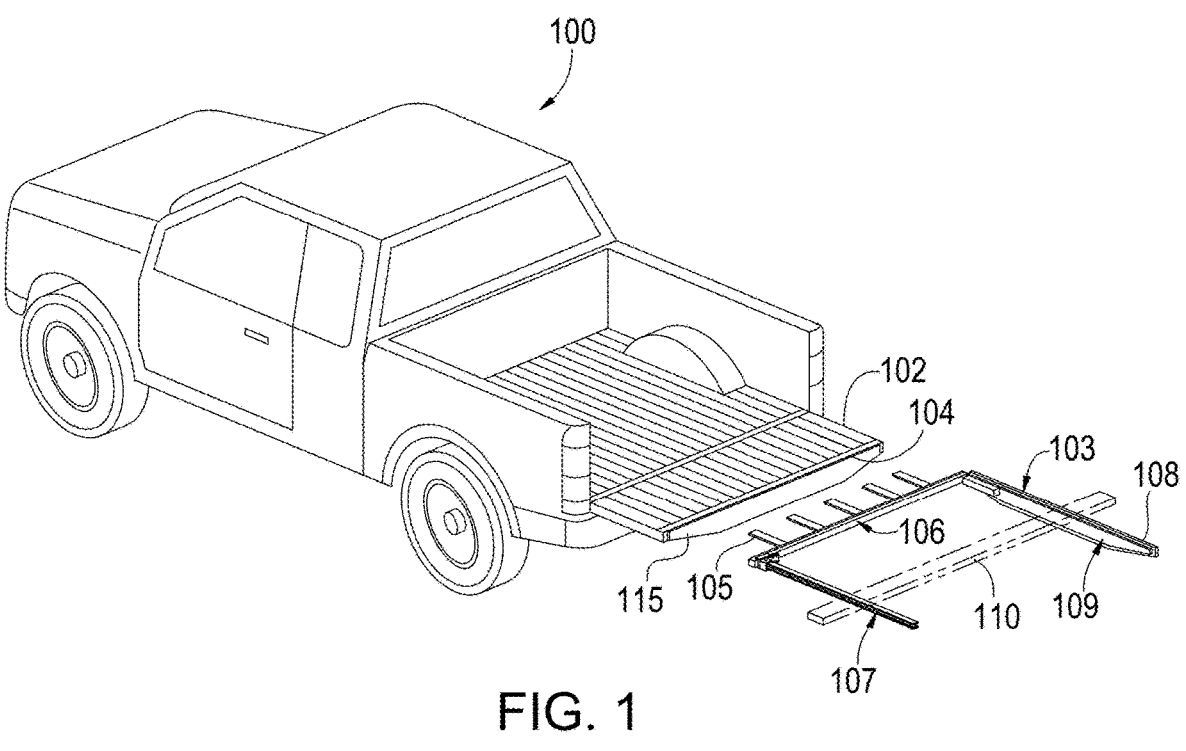
FIG. 1 is a truck showing an exploded view of a tail gate extension in accordance with an embodiment of the present disclosure and a left tail gate extension arm at a maximum distance from a right tail gate extension arm.

FIG. 1 is a truck showing an exploded view of a tail gate extension 103 relative to a truck 100 in accordance with an embodiment of the present disclosure. The tail gate extension 103 comprises a left tail gate extension arm 107 and a right tail gate extension arm 109.

As shown, the left tail gate extension arm 107 is at a maximum distance from the right tail gate extension am1 109. However, the left tail gate extension arm 107 is slidably and moveably horizontally thereby allowing the left tail gate extension arm 107 to be slidably moved toward and closer to the right tail gate extension arm 109.

When the left tail gate extension arm 107 is moved at a maximum distance horizontally from the right tail gate extension arm 109, a load 110 may be carried by the arms 107, 109. That is, the load 110 is placed atop the left tail gate extension arm 107 and the right tail gate extension arm 109.

As will be shown and described herein, the tail gate extension 103 is coupled to a tail gate 102 of the truck 100. In this regard, the tail gate extension 103 comprises a foundation rod that comprises a plurality of slats 105 coupled to the foundation rod 106 that is parallel with an opening 104 in the tail gate 102. The foundation rod 106 and the slats 105 may be extruded metal. In other embodiments, the slats 105 may be coupled to the foundation rod 10 [5] 6 via connectors such as bolts or screws. Note that the rods may be made of metal or steel; however, they may be made of other materials in other embodiments. Further, the opening 104 in the tail gate 102 may be curvilinear as shown; however, it may be other shapes in other embodiments. Also note that the opening 104 opens into a compartment suitable 115 for storing the tail gate extension 103.

The right tail gate extension arm 109 is rotatably coupled to the foundation rod 106. Thus, the right tail gate extension am1 109 may be rotated inward so that it is adjacent and parallel to the foundation rod 106. Also, the right tail gate extension arm 109 may be rotated outward so that it is perpendicular to the foundation rod 106 and the tail gate 102.

The left tail gate extension arm 107 is rotatably coupled to the foundation rod 106. Thus, the left tail gate extension arm 107 may be rotated inward so that it is adjacent and parallel to the foundation rod 106. Also, the left tail gate extension arm 107 may be rotated outward so that it is perpendicular to the foundation rod 106 and the tail gate 102.

The right tail gate extension arm 109 may further comprise a cover 108. The cover 108 fixes to the tail gate extension arm 109. The cover 108 may display colors, for example, orange and while stripes that draw attention to the outward extending tail gate 102 or to identify the tail gate extension.

Figure 2:
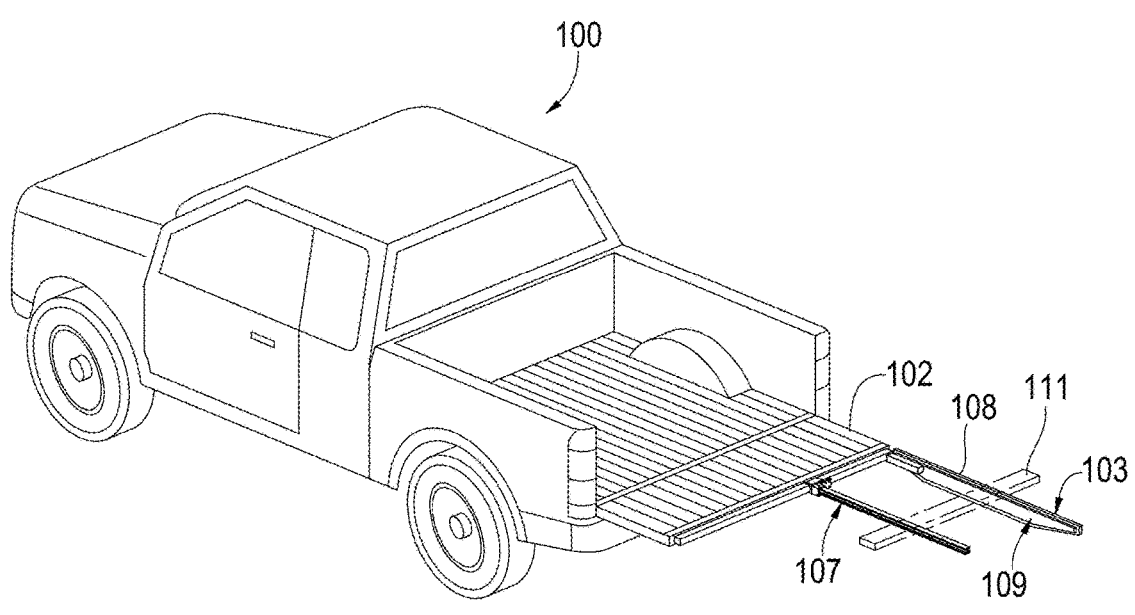
FIG. 2 is the truck showing the tail gate extension as shown in FIG. 1 coupled to the tail gate of a truck and a tail gate extension arm moved medially.

FIG. 2 is the truck 100 showing the tail gate extension 103 coupled to the tail gate 102 of the truck 100 and a tail gate extension aim 107 moved medially. As noted above, the tail gate extension arm 107 is moveable along a track (not shown) to accommodate differing sizes of loads, for example the smaller load 111 compared with the larger load 110 shown in FIG. 1, which will be described further herein.

In one embodiment, the tail gate extension am1 109 is fixed, and cannot be moved. However, the tail gate extension am1 109 may be moveable in other embodiments of the present disclosure.

The tail gate extension arm 109 may further comprise the cover 108, as described above. The cover 108 fixes to the tail gate extension arm 109. The cover 108 may display colors, for example, orange and while stripes that draw attention to the outward extending tail gate 102 or to identify the tail gate extension.

Figure 3:
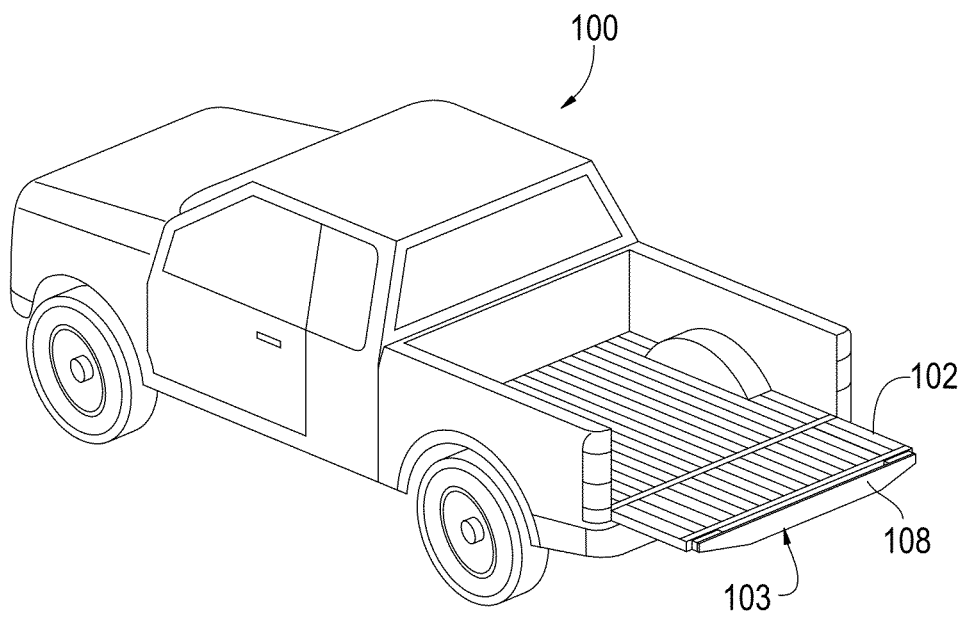
FIG. 3 is the truck showing the tail gate extension as shown in FIG. 1 coupled to the tail gate of a truck and in a stowed position when the tail gate is in an open position.

FIG. 3 is the truck 100 showing the tail gate extension 103 (FIG. 1) coupled to the tail gate 102 of the truck 100 and in a stowed position when the tail gate 102 is in an open position. Specifically, when the tail gate extension 103 is in the stowed position, the cover 108 is visible. Thus, if a vehicle is following the truck 100, the person driving the driver is aware that the tailgate 102 is in an open position because of the colors, for example, orange and white, are visible. The visibility of the cover 108 ensures that a driver does not mistakenly strike the tail gate 102 when the tail gate 102 is down.

When the tail gate extension 103 is not in use, the driver of the truck can stow the tail gate extension 103 in the compartment 115 of the tail gate 102. In this regard, slats 105 ingress into the compartment 115. The left gate extension arm 107 folds inward parallel to the opening 104, and the right gate extension am1 109 folds inward parallel to the opening 104.

Figure 4:
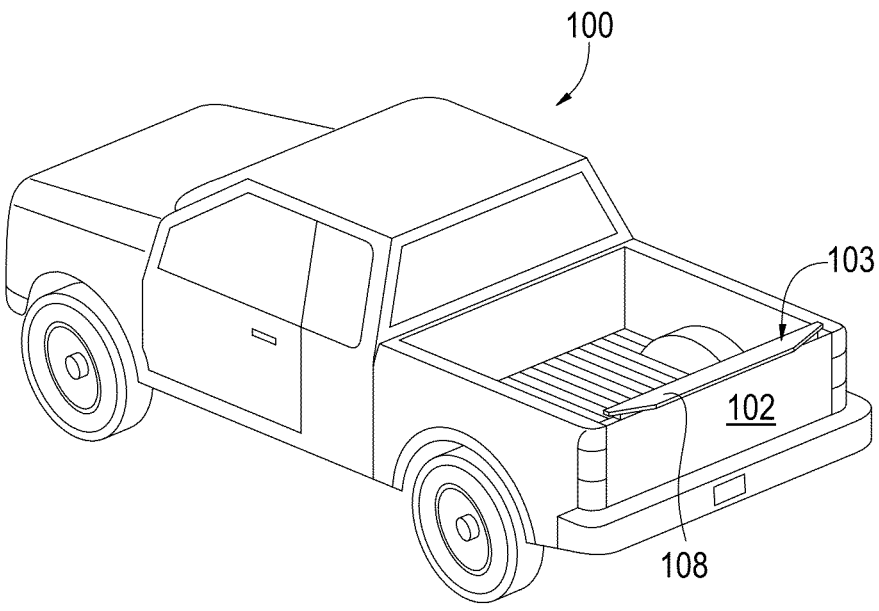
FIG. 4 is a truck showing the tail gate extension as shown in FIG. 1 coupled to the tail gate of the truck and in a towed position and the tail gate is in a closed position.

FIG. 4 is the truck 100 showing the tail gate extension 103 coupled to the tail gate 102 of the truck and in a stowed position and the tail gate 102 is in a closed position. The cover 108 indicates such as the colors, for example, orange and white stripes, are visible looking down upon the tail gate 102.

As described above, when the tail gate extension 103 is not in use, the driver of the truck can stow the tail gate extension 103 in the compartment 115 of the tail gate 102. In this regard, slats 105 ingress into the compartment 115 (FIG. 1). The left gate extension am1 107 folds inward parallel to the opening 104, and the right gate extension arm 109 folds inward parallel to the opening 104.

Thus, while the tail gate extension 103 is not in use and stowed in the compartment 115 and the tail gate 102 is closed in an upward position, the existence of the tail gate extension 103 is not in sight. Also, the tail gate extension 103 does not hinder the nom lal use of the truck 100 or the tail gate 102.

Figure 5:
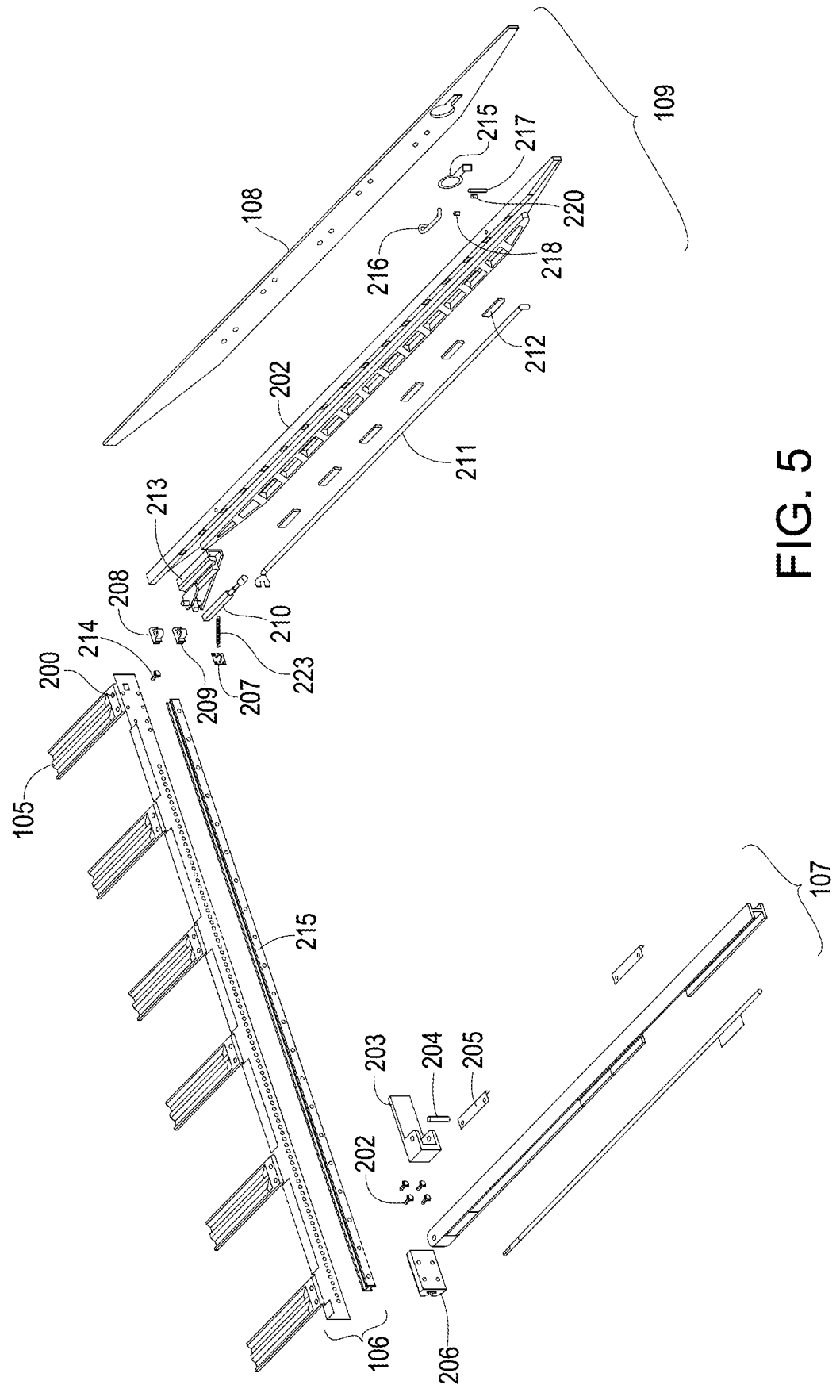
FIG. 5 is an exploded view of the tail gate extension as shown in FIG. 1.

FIG. 5 is an exploded view of the tail gate extension 103. The tail gate extension 103 comprises the foundation rod 106. The foundation rod 106 comprises a support channel 200. The support channel 200 comprises the plurality of slats 105. Note that the support channel 200 and the slats 105 may be made of metal or steel in one embodiment; however, the support channel 200 and the slats 105 may be made of other materials in other embodiments. Also note that the support channel 200 and the slats 105 may be made of extruded metal as one piece or the slats 105 may be coupled to the support channel 200 via a plurality of connectors such as bolts or screws.

The foundation rod 106 further comprises a guide rail 215 for a track roller carriage 206. The guide rail 215 is coupled to the support channel 200 via one or more screws or bolts 202.

The tail gate extension arm 109 comprises a fixed pole 202. That is, fixed pole 202 is not moveable along the guide rail 215 for track roller carriage or otherwise. Further, the right tail gate extension 109 is coupled to the cover 108. In this regard, the right tail gate extension arm 109 comprises axles 218, 217, and 220. The axles 218, 217, and 220 coupled to the pulling rod 216 and the pull handle 215 to allow the tail gate extension 109 to be stowed.

The tail gate extension arm 109 further comprises a pulling slider 211 coupled to the fixed pole 202 via brackets 212. The pulling slider 211 enables the tail gate extension arm 109 to be rotated outwardly to an open position. The pulling slider 211 is coupled to a fixed pole locker support 210 and sprint support 207, which couples the spring 223 to the fixed pole locker support 210.

A fixed pole support 213 is coupled to a bearing housing 208 with bearing 209 via a plurality of rivets 214. The fixed pole support 213 ensures that when the right tail extension arm 109 is towed, it locks in place so that it does not cause a hazard by being loose during operation of the vehicle.

To stow the tail gate extension 103, the left tail gate extension arm 107 is rotated inward parallel to and adjacent the guide rail 215. The right tail gate extension arm 109 is rotated inward parallel to and adjacent the left tail gate extension arm 107 where the left tail gate extension arm 107 is locked place.

During use, the left tail gate extension arm 107 may move via the roller carriage 215 at any point along the roller carriage 215. This shall allow the tail gate extension 103 to accommodate different sizes of loads, as described above.

What I claim is:

1. A truck, comprising:
   a tail gate having a compartment;
   a left tail gate extension arm rotatably coupled adjacent to and parallel to the foundation rod when in a closed position is configured to rotate outwardly extending a width of the tail gate when the tail gate is in a down position;
   a right tail gate extension arm rotatably coupled adjacent to and parallel to the foundation rod and adjacent the left tail gate extension arm when the left tail gate extension arm and the right tail gate extension arm are in a closed position and is configured to rotate outwardly extending the width of the tail gate when the tail gate is in the down position,
   wherein a length of a bed of the truck is extended beyond the width of the tail gate when the left tail gate extension arm and the right tail gate extension arm are rotated outwardly.

2. The truck of claim 1, wherein the opening is curvilinear.

3. The truck of claim 1, wherein the opening is rectangular.

4. The truck of claim 1, wherein the left tail gate extension arm rotatably foldable to an outward position that is perpendicular to the opening in the compartment and perpendicular to the tail gate.

5. The truck of claim 1, wherein the right tail gate extension arm is rotatably foldable to an outward position that is perpendicular to the opening in the compartment and perpendicular to the tail gate.

6. The truck of claim 1, wherein at least one of the left tail gate extension arm or the right tail gate extension arm is moveable laterally to vary a distance between the left tail gate extension arm and the right tail gate extension arm.

7. The truck of claim 1, wherein at least one of the left tail gate extension arm or the right tail gate extension arm is fixedly coupled so that it is not moveable laterally.

8. The truck of claim 1, wherein the left tail gate extension arm and the right tail gate extension arm are rotatably coupled to a foundation rod that extends a width length of the tail gate.

9. The truck of claim 8, wherein the foundation rod comprises a guide rail for a track roller carnage.

10. The truck of claim 9, wherein the left tail gate extension arm comprises a track roller carriage that couples to the guide rail for a track roller carriage so that the left tail gate extension arm is moveable when in an open position.

11. The truck of claim 9, wherein the right tail gate extension arm comprises a track roller carriage that couples to the guide rail for a track roller carriage so that the right tail gate extension arm is moveable when in an open position.

12. The truck of claim 1, wherein the right tail gate extension arm comprises a cover configured for notifying that the right tail gate extension arm is contained in the tail gate or is in an open position.

13. The truck of claim 1, wherein the left tail gate extension arm comprises a cover configured for notifying that the left tail gate extension arm is contained in the tail gate or is in an open position.

14. The truck of claim 1, wherein the left tail gate extension arm has a free end opposing an end coupled to the foundation arm and the right tail gate extension arm has a free end opposing an end coupled to the foundation arm and a free end opposing an end coupled to the foundation arm.

15. A tail gate extension, comprising:
  a foundation rod configured to be inserted in and coupled to a compartment of a tail gate that is fixedly coupled to a truck;
  tail gate having a compartment;
  left tail gate extension arm rotatably coupled adjacent to and parallel to the foundation rod when in a closed position and is configured to rotate foldable outwardly to a position perpendicular to the foundation rod extending a width of the tail gate when the tail gate is in the down position; and right tail gate extension arm rotatably coupled adjacent to and parallel to the foundation rod when in a closed position and is configured to rotate outwardly to a position perpendicular to the foundation rod extending the width of the tail gate when the tail gate is in the down position,
  wherein a length of a bed of the truck is extended beyond the width of the tail gate when the left tail gate extension arm and the right tail gate extension arm are rotated outwardly.

16. The tail gate extension of claim 15, wherein the left tail gate extension arm is rotatably foldable to an outward position that is perpendicular to the opening in the compartment and perpendicular to the tail gate.

17. The tail gate extension of claim 15, wherein the right tail gate extension arm is rotatably foldable to an outward position that is perpendicular to the opening in the compartment and perpendicular to the tail gate.

18. The tail gate extension of claim 15, wherein at least one of the left tail gate extension arm or the right tail gate extension arm is moveable laterally a distance between the left tail gate extension arm and the right tail gate extension arm.

19. The tail gate extension of claim 15, wherein at least one of the left tail gate extension arm or the right tail gate extension and is fixedly coupled so that it is not moveable laterally.

20. The tail gate extension of claim 15, wherein the left tail gate extension arm and the right tail gate extension arm are rotatably coupled to a foundation rod that extends a width length of the tail gate.

21. The tail gate extension of claim 20, wherein the foundation rod comprises a guide rail for a track roller carriage.

22. The tail gate extension of claim 20, wherein the left tail gate extension arm comprises a track roller carriage that couples to the guide rail for a track roller carriage so that the left tail gate extension arm is moveable when in an open position.

23. The tail gate extension of claim 20, wherein the right tail gate extension arm comprises a track roller carriage that couples to the guide rail for a track roller carriage so that the right tail gate extension arm is moveable when in an open position.

* * * * *